US011293343B2

(12) United States Patent
Hwang

(10) Patent No.: US 11,293,343 B2
(45) Date of Patent: Apr. 5, 2022

(54) CATALYTIC BIOGAS COMBINED HEAT AND POWER GENERATOR

(71) Applicant: Herng Shinn Hwang, Livingston, NJ (US)

(72) Inventor: Herng Shinn Hwang, Livingston, NJ (US)

(*) Notice: Subject to any disclaimer, the term of this patent is extended or adjusted under 35 U.S.C. 154(b) by 321 days.

(21) Appl. No.: 16/557,190

(22) Filed: Aug. 30, 2019

(65) Prior Publication Data

US 2019/0383212 A1 Dec. 19, 2019

Related U.S. Application Data

(62) Division of application No. 15/813,914, filed on Nov. 15, 2017, now Pat. No. 10,626,790.

(Continued)

(51) Int. Cl.
*F02B 43/12* (2006.01)
*C01B 3/36* (2006.01)
(Continued)

(52) U.S. Cl.
CPC ............... *F02B 43/12* (2013.01); *C01B 3/36* (2013.01); *C01B 3/40* (2013.01); *C10L 3/103* (2013.01);
(Continued)

(58) Field of Classification Search
CPC ............... C01B 2203/127; F01N 3/085; F01N 2570/04; B01D 2255/1021;
(Continued)

(56) References Cited

U.S. PATENT DOCUMENTS 2,882,912 A * 4/1959 Reeg ............... C10G 49/14
134/155
2,925,375 A * 2/1960 Fleck ............... C10G 67/06
208/89

(Continued)

FOREIGN PATENT DOCUMENTS

TW          I617508 B      6/2018
WO          2001034950     5/2001

OTHER PUBLICATIONS

Hwang, H.S. et al., AiChe Annual Meeting, Los Angels Ca. Nov. 15, 2000.

(Continued)

*Primary Examiner* — Imran Akram
(74) *Attorney, Agent, or Firm* — Niels Haun; Dann, Dorfman, Herrell & Skillman, P.C.

(57) ABSTRACT

An apparatus and method to desulfurize a biogas containing sulfur. Since biogas is produced by an anaerobic digester from human, animal, kitchen and agriculture's wastes, it is a short term recycled product from the photosynthesis of $CO_2$, and has a net zero carbon emission. The sulfur compounds in the biogas can be removed by the following steps: (1) converting all sulfur compounds into $H_2S$ by the hydrogen produced from the biogas over Pt group metal catalysts; (2) adsorbing the $H_2S$ at high temperature by the regenerable Pt group metal catalyst and adsorbents. The desulfurized biogas is further converted by an ATR/CPO reformer or a steam generating reformer to produce various reformates.

10 Claims, 4 Drawing Sheets

Related U.S. Application Data

(60) Provisional application No. 62/422,756, filed on Nov. 16, 2016.

(51) Int. Cl.

| | |
|---|---|
| *C01B 3/40* | (2006.01) |
| *F02D 19/06* | (2006.01) |
| *F02M 27/02* | (2006.01) |
| *F01K 23/18* | (2006.01) |
| *F02B 63/04* | (2006.01) |
| *G05B 15/02* | (2006.01) |
| *C10L 3/10* | (2006.01) |
| *F02B 43/10* | (2006.01) |
| *F03D 9/17* | (2016.01) |
| *F22B 1/18* | (2006.01) |

(52) U.S. Cl.
CPC ............. *F01K 23/18* (2013.01); *F02B 63/04* (2013.01); *F02D 19/0644* (2013.01); *F02M 27/02* (2013.01); *G05B 15/02* (2013.01); *C01B 2203/0244* (2013.01); *C01B 2203/0261* (2013.01); *C01B 2203/1023* (2013.01); *C01B 2203/1035* (2013.01); *C01B 2203/1064* (2013.01); *C01B 2203/127* (2013.01); *C01B 2203/1241* (2013.01); *C10L 2290/542* (2013.01); *C10L 2290/562* (2013.01); *F02B 2043/106* (2013.01); *F03D 9/17* (2016.05); *F22B 1/1838* (2013.01)

(58) Field of Classification Search
CPC ............. B01D 2257/30; B01D 53/8603; B01J 20/3433; B01J 23/40
See application file for complete search history.

(56) References Cited

U.S. PATENT DOCUMENTS

| | | | |
|---|---|---|---|
| 2,944,396 A | 7/1960 | Barton | |
| 3,388,074 A | 6/1968 | Reitmeier | |
| 3,446,594 A | 5/1969 | Buswell | |
| 3,654,182 A * | 4/1972 | Hayes | B01J 38/44 502/37 |
| 3,655,448 A | 4/1972 | Setzer | |
| 3,915,125 A | 10/1975 | Henkel | |
| 3,955,941 A | 5/1976 | Houseman | |
| 3,971,847 A | 7/1976 | Houseman | |
| 3,975,900 A | 8/1976 | Pfefferle | |
| 3,976,507 A | 8/1976 | Bloomfield | |
| 3,982,910 A | 9/1976 | Houseman | |
| 4,024,912 A | 5/1977 | Hamrick | |
| 4,033,133 A | 7/1977 | Houseman | |
| 4,044,133 A | 8/1977 | Rogers | |
| 4,109,461 A | 8/1978 | Fujitani | |
| 4,120,787 A | 10/1978 | Yargeau | |
| 4,128,700 A | 12/1978 | Sederquist | |
| 4,200,682 A | 4/1980 | Sederquist | |
| 4,203,963 A | 5/1980 | Scheffler | |
| 4,522,894 A | 6/1985 | Hwang et al. | |
| 4,552,733 A | 11/1985 | Thompson et al. | |
| 4,567,857 A | 2/1986 | Houseman | |
| 4,622,210 A | 11/1986 | Hirschberg et al. | |
| 4,780,447 A | 10/1988 | Kim et al. | |
| 4,844,837 A | 7/1989 | Heck | |
| 4,939,113 A | 7/1990 | Tauster et al. | |
| 5,024,985 A | 6/1991 | Koberstein et al. | |
| 5,196,390 A | 3/1993 | Tauster et al. | |
| 5,235,804 A | 8/1993 | Colket, III | |
| 5,326,253 A | 7/1994 | Dalla Betta | |
| 5,425,332 A | 6/1995 | Rabinovich | |
| 5,441,401 A | 8/1995 | Yamaguro | |
| 5,586,433 A | 12/1996 | Boegner | |
| 5,648,582 A | 7/1997 | Schmidt | |
| 5,794,601 A | 8/1998 | Pantone | |
| 5,896,738 A | 4/1999 | Yang | |
| 5,947,063 A | 9/1999 | Smith | |
| 5,987,878 A | 11/1999 | Koyama | |
| 6,110,861 A | 8/2000 | Krumpelt | |
| 6,254,807 B1 | 7/2001 | Schmidt | |
| 6,358,040 B1 | 3/2002 | Pfefferle | |
| 6,415,775 B1 | 7/2002 | Lahti | |
| 6,436,363 B1 | 8/2002 | Hwang | |
| 6,655,130 B1 | 12/2003 | Kirwan | |
| 6,682,838 B2 | 1/2004 | Stevens | |
| 6,713,040 B2 | 3/2004 | Ahmed | |
| 6,845,610 B2 | 1/2005 | Shiino | |
| 6,849,572 B2 | 2/2005 | Hwang | |
| 6,849,752 B2 | 2/2005 | Tsujioka | |
| 6,895,746 B2 | 5/2005 | Buglass | |
| 6,936,082 B2 | 8/2005 | Primdahl | |
| 6,946,209 B1 | 9/2005 | Israelson | |
| 6,960,840 B2 | 11/2005 | Willis | |
| 6,964,156 B2 | 11/2005 | Liu | |
| 6,977,067 B2 | 12/2005 | Hwang | |
| 7,028,644 B2 | 4/2006 | Cohn et al. | |
| 7,074,375 B2 | 7/2006 | Lampert et al. | |
| 7,082,753 B2 | 8/2006 | Dalla Betta | |
| 7,101,531 B2 | 9/2006 | Kamijo | |
| 7,128,768 B2 | 10/2006 | Liu et al. | |
| 7,225,787 B2 | 6/2007 | Bromberg et al. | |
| 7,255,848 B2 | 8/2007 | Deluga | |
| 7,262,334 B2 | 8/2007 | Schmidt | |
| 7,610,752 B2 | 11/2009 | Dalla Betta | |
| 7,721,682 B2 | 5/2010 | Fulton et al. | |
| 7,810,315 B2 | 10/2010 | Yan | |
| 7,820,037 B2 | 10/2010 | Masuda et al. | |
| 7,871,459 B2 | 1/2011 | Stephanopoulos et al. | |
| 7,900,441 B2 | 3/2011 | Mital | |
| 7,901,566 B2 | 3/2011 | Giroux et al. | |
| 8,061,120 B2 | 11/2011 | Hwang | |
| 8,091,536 B2 | 1/2012 | Munshi | |
| 8,236,262 B2 | 8/2012 | Potter et al. | |
| 8,308,848 B1 | 11/2012 | Alptekin et al. | |
| 8,396,644 B2 | 3/2013 | Kabashima | |
| 8,397,509 B2 | 3/2013 | Hwang | |
| 8,430,938 B1 | 4/2013 | Miller | |
| 9,034,527 B2 | 5/2015 | Budge | |
| 9,421,516 B2 | 8/2016 | Alhooshani et al. | |
| 9,440,851 B2 | 9/2016 | Hwang | |
| 9,515,338 B2 | 12/2016 | Budge | |
| 9,640,822 B2 | 5/2017 | Budge | |
| 10,626,790 B2 | 4/2020 | Hwang | |
| 2001/0016184 A1 | 8/2001 | Campbell | |
| 2001/0046462 A1 | 11/2001 | Woods | |
| 2003/0039871 A1 | 2/2003 | Christen | |
| 2004/0106837 A1 | 6/2004 | Lampert | |
| 2004/0178124 A1 | 9/2004 | Liu | |
| 2004/0180974 A1 | 9/2004 | Espinoza | |
| 2005/0229488 A1 | 10/2005 | Stevens | |
| 2005/0268553 A1 | 12/2005 | Liu et al. | |
| 2006/0076270 A1 | 4/2006 | Poshusta et al. | |
| 2006/0130402 A1 | 6/2006 | Wheat | |
| 2006/0174941 A1 | 8/2006 | Cohen | |
| 2007/0237696 A1 | 10/2007 | Payton | |
| 2007/0244208 A1 | 10/2007 | Shulenberger | |
| 2007/0275278 A1 | 11/2007 | Hwang | |
| 2008/0005963 A1 | 1/2008 | Wheat | |
| 2008/0032245 A1 | 2/2008 | Bushnell | |
| 2008/0161428 A1 | 7/2008 | Strait | |
| 2008/0220300 A1 | 9/2008 | Jones | |
| 2009/0035192 A1 | 2/2009 | Hwang | |
| 2009/0258780 A1 * | 10/2009 | Toba | B01J 27/22 502/177 |
| 2009/0266772 A1 | 10/2009 | Martinez De La Ossa Fernandez | |
| 2010/0062925 A1 | 3/2010 | Morton et al. | |
| 2011/0023453 A1 | 2/2011 | Lucka | |
| 2011/0041815 A1 | 2/2011 | Henriksson | |
| 2011/0067382 A1 | 3/2011 | Federle | |
| 2012/0067304 A1 | 3/2012 | Littmann | |
| 2013/0174485 A1 | 7/2013 | Roychoudhury et al. | |
| 2013/0209338 A1 | 8/2013 | Prasad et al. | |

(56) References Cited

U.S. PATENT DOCUMENTS

2014/0017583 A1 1/2014 Roychoudhury et al.
2014/0197074 A1* 7/2014 Bourane .................. B01J 23/80
                                                         208/211
2020/0116082 A9 4/2020 Hwang

OTHER PUBLICATIONS

Bromberg, L. et al., Diesel Engine Emission Workshop, Newport, RI Aug. 24-28, 2003.
Deluga,G.A. et al., Science vol. 303, p. 993, 2004.
Salge, J.R. et al., Science vol. 314, p. 801, 2006.
Department of Energy; Office of transportation Technoligies; Onboard production of hydrogen fuel for improving internal combustion engine vehicles; Plasmatron Fuel Converter ; Dec. 2001.
Thomas Giroux et al.; Monolithic structures as alternatives to particulate catalysts for the reforming of hydrocarbons for hydrogen generation; Applied Catalysis B: Environmental 55 (2005) 185-200; Feb. 6, 2004.
D.R. Cohn, Fusion Power Assoc. Meeting, Nov. 21, 2003.
G. Voecks "Unconventional Utilization of Monolithic Catalysts for Gas-Phase Reactions",Jet Propulsion Laboratory, Pasadena, California; Marcel Dekker, Inc. p. 179-206(1998).
Hwang, 2006 NATPA Annual Conference, Newark, California, Jul. 29, 2006.

* cited by examiner

CATALYTIC BIOGAS COMBINED HEAT AND POWER GENERATOR

CROSS-REFERENCE TO RELATED APPLICATIONS

This is a Divisional application of patent application Ser. No. 15/813,914, application, filed Nov. 15, 2017 which claimed priority under 35 U.S.C. § 119(e) to U.S. Provisional Patent Application No. 62/422,756, filed Nov. 16, 2016. The foregoing application is incorporated by reference herein.

BACKGROUND OF THE INVENTION

The $CO_2$ in the atmosphere is constantly captured and converted through photosynthesis by various types of plants to produce human or animals' foods, such as sugar, starch, rice, wheat, potato, yam, grass, algae, vegetable, tree leaves, fruits et. al. After these foods are digested by human or animals, their excreta or the excess kitchen and agriculture's wastes can be used to produce biogas by an anaerobic digester, and the subsequent use of this biogas as a fuel for a combined heat and power (CHP) generator is realistically just returning the captured $CO_2$ back into the atmosphere. In other words, the biogas is actually a short term recycled product of converting $CO_2$ from one type of energy material into various other types of energy material and/or biomass, and the net carbon emission from a biogas CHP generator is zero. Therefore, using biogas as a fuel for a heat and power generator can reduce worldwide net carbon emission.

Anaerobic Digester:

By using the fermentation process in the absence of oxygen at about 38° C. (i.e. about 100° F.), an anaerobic digester can be used to produce biogas, odorless organic water, and odorless solid fertilizer from the waste materials. The biogas produced from the digester consists of 55-60% methane, 40-45% $CO_2$, 0.4-1.2% N2, 0.0-0.4% $O_2$ and 0.02-0.4% $H_2S$ (americanbiogascouncil.org).

Combustible Reformed Gas and IC Engine (i.e. Reformate Engine):

A lot of Internet videos and documents have showed that a reformate gas containing hydrogen and CO can successfully be used as the sole fuel for an internal combustion engine. For example, the reformate gas produced from the partial combustion of woods had been used for several years in Germany during World War II (https://www.youtube.com/watch?v=blWVB-JpdEk). Also, a small California company, All Power Laboratory, has designed a small gasifier to generate combustible $H_2$ and CO gas from waste woods and husk, and has used this gas as the only fuel for a commercial IC engine. It has been reported that the combination of their gasifier, an IC engine and an electrical generator can generated enough electricity for their own facility from the waste biomass.

U.S. Pat. Nos. 7,028,644 and 7,225,787, herein incorporated by references, had used an on-board Plasmatron converter to produce the $H_2$ and CO reformate from hydrocarbons (HC) and bio-fuels. This reformate gas could then be mixed with extra air and fuel to become a lean burn fuel mixture as the engine's sole fuel, and the engine can then be operated under higher compression ratio. As the results, this on-board Plasmatron reformer could increase gasoline engine's thermal efficiency by 20-25%, could reduce gasoline engine's $NO_x$ emission up to 90% and could reduce diesel engine's emission by 90% (Diamond and Cohn, Office of Transportation Technologies, press release 12/2001).

Flexible-Fuel Hydrogen Generator for IC Engines and Gas Turbines:

U.S. Pat. No. 9,440,851, herein incorporated by reference, describes the use of an on-board catalytic reformer to produce $H_2$ and CO reformate gas from various vaporized hydrocarbons and/or bio-fuels and, thus, it can be used to replace the Plasmatron reformer to generate $H_2$ for the IC engine. Since this reformer uses the Pt group metal catalysts to accelerate the reactions, and it also includes the necessary devices and the control software for automatic operation of the generator, this catalytic reformer is fundamentally very different in equipment design and the operating procedures from those of the homogeneous (i.e. non catalytic) partial oxidation gasifier or Plasmatron.

The reformed gas so produced can be cooled, dried and compressed to 1-100 atmospheres, and can be stored in one or several high pressure vessels. This stored combustible reformate can then be used as a sole fuel for a reformate IC engine/gas turbine, which will drive a generator to produce electricity, or it can be combined with extra air and extra fuel to become a lean burn fuel mixture for the IC engine/gas turbine. By utilizing this lean combustion process at a higher compression ratio, complete combustion reactions inside the engine cylinder can successfully increase the engine/gas turbine's thermal efficiency and can also reduce its pollution emission.

Removing Hydrogen Sulfide from Biogas and the Common Industrial Desulfurization Process:

The biogas from the anaerobic digester contains 0.02-0.4% hydrogen sulfide ($H_2S$). After complete combustion inside an engine cylinder, the $H_2S$ will be converted into SOx, which will combine with moisture/steam and produce acid in the exhaust gas. Therefore, to avoid corrosion to the downstream IC engine and other equipment, this $H_2S$ biogas must be removed before using it as the direct IC engine/gas turbine's fuel.

Currently, the common low temperature sulfur removal processes for biogas are water wash, caustic soda solution wash (solutions such as sodium hydroxide, potassium hydroxide, calcium hydroxide, mono ethanolamine etc.), iron oxides, iron sponge, activated carbon, molecular sieve, silica gel, activated alumina, bio-bacteria sulfur removal technology, pressure swing adsorption process etc. However, if the above adsorbents are used, they either are non-regenerable or cannot be regenerated repeatedly for long term application. Therefore, they have waste disposal problem once they reach their saturation capacity (Allegue and Hinge, Danish Technological Institute, December 2014).

One common commercial industrial sulfur removal technology is to use the catalytic hydro-desulfurization process, which can convert any organic sulfur compounds catalytically with the recycled hydrogen to produce $H_2S$ over a Co—Mo/$Al_2O_3$ catalyst at 500° C. and 100 atmospheres and, then, the process will use ZnO adsorbent to remove the $H_2S$ from the gas stream. In 1985, U.S. Pat. No. 4,522,894, herein incorporated by reference, had described a new catalytic autothermal reforming (ATR) process to produce hydrogen and CO over a monolithic Pt/Pd/$Al_2O_3$ catalyst from a diesel oil, air and steam fuel mixture at $O_2$/C ratio=0.378, $H_2O$/C ratio=2.57, 1 atmosphere and a temperature <1000° C. Under this operating condition, all organic sulfur compounds (about 0.12% sulfur) in the commercial diesel oil were converted into hydrogen sulfide at about one atmosphere, and the produced $H_2S$ in the reformate was then removed by a downstream high temperature ZnO adsorbent bed. In addition, U.S. Pat. No. 7,128,768, herein incorporated by reference, has described the use of a mini catalytic reformer or other $H_2$ generator to produce dry hydrogen to convert all sulfur compounds in the hydrocarbons into $H_2S$, and then removed the $H_2S$ by a downstream ZnO bed. However, the ZnO adsorbent needs to be replaced once it reaches its saturation capacity as shown in US 2004/0178124 A1, herein incorporated as reference.

U.S. Pat. No. 7,074,375, herein incorporated by reference, describes a catalytic oxidation process of converting all sulfur compounds into SOx (i.e. $SO_2$ and $SO_3$) with an oxidation catalyst at a $O_2/C$ ratio between 0.01 to 0.04, and at a preferred temperature between 250 to 400° C. The SOx produced can be removed by the downstream adsorbents such as alkali metal oxides, alkali earth metal oxides and/or base metal oxides (i.e. oxides of Ni, Fe, Cu, Zn supported on porous $SiO_2$ or $Al_2O_3$). Subsequent U.S. Pat. Nos. 9,034,527, 9,640,822 and 9,515,338, herein incorporated by references, have advanced this catalytic oxidation process to remove the organic sulfur compounds from various hydrocarbons. Briefly, this patented sulfur removing process is to control the $O_2/C$ ratio below 0.04 over an oxidation catalyst to produce selectively SOx, but not to hydrogenate the sulfur compounds into $H_2S$ over a Pt group metal hydrogenation catalyst. As shown in the patent, $H_2S$ will be produced if $O_2/C$ ratio of the feed gas is greater than 0.04, especially above 0.08.

U.S. Pat. Nos. 7,820,037, 8,236,262, 8,308,848 and 9,421,516, herein incorporated as references, describe the preparation methods for Cu—Zn—Al—Ni/Fe, Ni—Cu—Al—Na—Zn, Ni/Al and Al/Ni/Zn oxide catalysts, which are used as adsorbents for removing sulfur compounds from various hydrocarbon fuels.

U.S. Pat. Nos. 4,552,733, 4,780,447, 4,939,113, 5,024,985, 5,196,390 and 7,871,459, herein incorporated as references, have shown that all sulfur compounds in the gasoline are converted into $SO_2$ after the engine combustion, and the $SO_2$ is stored by the downstream catalytic converter's oxygen storage component, which is mainly cerium oxide, as sulfate, sulfide and/or sulfur radicals. The stored sulfur is released as $H_2S$ later by the next engine's rich operating mode. Therefore, it has been demonstrated that the Pt group catalyst, which also contains one or more oxides of Ni, Fe, Cu, Mn, Ce, Ce/Zr and mixture thereof, is able to remove $H_2S$ from the exhaust gas by adsorption/reaction during the engine's rich operating mode and, then, be regenerated by converting the stored sulfur into $SO_2$ with the exhaust gas during the next engine's lean operation mode, which contains a small % of excess $O_2$.

U.S. Pat. No. 7,901,566, herein incorporated as reference, describes the use of a catalyst in a pre-reformer to remove sulfur compounds from the hydrocarbon (HC) fuels with steam. The catalyst is a Pt/Rh supported on a non-sulfating $SiO_2$—$ZrO_2$ oxide, which also consists at least one member of Ni, NiO, Mn, MnO, Fe, FeO and $Fe_2O_3$. The deactivated catalyst can then be regenerated either with $O_2$ or with a gas mixture consisting of $O_2$, steam and HC to remove the adsorbed sulfur on the catalyst surface as $SO_2$.

BRIEF SUMMARY OF THE INVENTION

This distributed combined heat and power generator is to utilize the biogas from an anaerobic digester to provide heat and electricity to the local residents for their daily living. It can also avoid about 10% electricity transmission loss and/or any transmission power loss due to bad weather. Furthermore, since this catalytic reformer can produce $H_2$ and CO from other fuels, any vaporized hydrocarbons or bio-fuels can be used to replace the biogas for generating heat and power with the same equipment. Therefore, this catalytic biogas CHP generator is actually a multi-fuel CHP generator.

To avoid severe corrosion to the downstream equipment, and to increase the $H_2S$ adsorption capacity by the adsorbents, a new desulfurization system, which comprises one catalytic partial oxidation (CPO) sulfur converter and one high temperature regenerable adsorbent bed, is specifically designed to remove the $H_2S$ and other sulfur compounds from the biogas, and this new desulfurization system is installed between the biogas storage tank and the main reformers as shown by #8 in FIG. 2.

As shown in FIG. 2, if the biogas contains high % sulfur compounds and/or other various containments, one low temperature pre-desulfurizer bed at a temperature between −25° to 50° C. can be installed between the biogas storage tank and this new desulfurization system. Briefly, this low temperature pre-desulfurizer bed utilizes one or more methods selected from the group consisting of liquid wash, filter, oxide adsorbents and/or the regenerable supported Pt group metal catalysts to remove moisture, sulfur and other containments from the biogas. However, the regenerable Pt group metal catalysts is preferred to be used in this bed, and its preparation method will be discussed in the following sections. Subsequently, the partially purified biogas can enter into the CPO sulfur converter of this new desulfurization system for further sulfur removal from the biogas.

For the CPO sulfur converter in this new desulfurization system, all sulfur compounds are converted into $H_2S$ over Pt group catalysts by the hydrogen produced from the CPO reactions of biogas under the $O_2/C$ ratio of 0.05 to 0.25 and a temperature between 200° to 800° C. The produced $H_2S$ can then be removed from the reformate at a temperature between 300° to 900° C. by the supported regenerable Pt group metal catalysts, which also contain the $H_2S$ adsorbent oxides. Here, the Pt group metal catalysts, which comprise one or more metals of Pt, Pd, Rh, Ir, Ru, Os and mixture thereof, are supported on a stabilized $Al_2O_3$. The $Al_2O_3$ power has surface area between 50 to 600 m2/g, and also contains high temperature oxide stabilizer such as one or more oxides selected from the group of lanthanum, cerium, praseodymium, rhenium, zinc, tin, calcium, potassium, zirconium, yttrium, barium, strontium, neodymium, magnesium and the mixture thereof. Furthermore, one or more oxides, which are selected from the group of Ni, Cu, Fe, Co, Mo, Zn, Cu/Zn, Ce, Ce/Zr, Al, Mn and the mixture thereof, can be added to the above Pt metal group catalysts as the $H_2S$ adsorbents, and these $H_2S$ adsorbents are either unsupported oxides or oxides supported on the above stabilized $Al_2O_3$.

Subsequently, the desulfurized biogas can mix with additional $O_2$/air and water to adjust the inlet fuel mixture's $O_2/CH_4$ and $H_2O/CH_4$ ratios, and this fuel mixture can then be injected into: (1). a Flex-Fuel Autothermal (ATR) reformer to convert the remaining bio-methane to increase the % $H_2$ in the reformate for fuel cell devices, and/or for the energy (i.e. excess electricity) storage as $H_2$ gas; (2) a CPO reformer to adjust the produced reformate's $H_2/CH_4$ ratio as a fuel for a reformate IC engine/gas turbine, which can perform $H_2$ assisted lean combustion at a high compression ratio; or (3). a catalytic steam generating reformer to produce high pressure steam reformate, which can drive a steam turbine/steam engine and an electrical generator for generating electricity.

Three chemical processes can satisfactorily be used to produce $H_2$ and CO from biogas, and these chemical reactions are as followings:

(1). Steam Reforming Reformer (SR, Endothermic reaction):

$$CH_4 + H_2O \rightarrow CO + 3H_2$$

(2). Catalytic Partial Oxidation Reformer (CPO, Exothermic reaction):

$$CH_4 + \tfrac{1}{2}O_2 \rightarrow CO + 2H_2$$

(3). Autothermal Reformer (ATR, Adiabatic reaction):

CPO+SR $$2CH_4 + \tfrac{1}{2}O_2 + H_2O \rightarrow 2CO + 5H_2$$

Another catalytic reaction is very useful to generate high pressure steam from biogas over the Pt group metal catalysts:

(4). Complete Catalytic Combustion-steam generating reformer (Exothermic Reaction):

$$CH_4 + 2O_2 \rightarrow CO_2 + 2H_2O$$

In the last several decades, numerous patents and technical papers have published the results of the above reactions over the supported and unsupported Pt group catalysts with excellent activity and selectively. However, by analyzing the experimental facts, the results can be explained and summarized as: (A). reaction (2) is the dominant reaction when $O_2/CH_4$ ratio of the inlet fuel mixture is less than 0.60; (B). reaction (1) is the only possible reaction without $O_2$ in the fuel mixture; (C). reaction (4) is the dominant reaction when $O_2/CH_4$ is over 1.00; (D). rate of reaction (2) is much faster than rate of reaction (1), i.e. partial oxidation reaction is the dominant reaction when both $O_2$ and water are present in the inlet fuel mixture, and (E). reaction (3) is the combination of CPO reaction section followed by SR reaction section in an adiabatic reactor. Therefore, it can further be recognized and concluded from these studies that the reaction path and the reformate gas composition can be determined by simply controlling the $O_2/CH_4$ ratio of the reformer's inlet fuel mixture. In other words, by simply controlling the $O_2/CH_4$ ratio of the reformer's inlet fuel mixture and the operating conditions, the same flex-fuel catalytic reformer can be used to produce various reformate composition products, which can be utilized by various different power producing devices to produce heat and electricity for general applications.

U.S. Pat. No. 8,397,509, herein incorporated by reference, describes a "Catalytic Engine" process for generating a high pressure reformate, which contains high % steam, over the Pt group metal catalysts from hydrocarbons and bio-fuels by a catalytic reformer. This high pressure steam reformate is then used directly to drive a turbine, turbocharger and/or any type of gas turbine, and also to drive together an electric generator to generate electricity. Therefore, this "Catalytic Engine" process uses a catalytic reformer to replace a traditional shell and tube boiler for high pressure steam generation, and it can be used by a distributed stationary or mobile power station.

To extend the catalyst's life and to maintain high methane conversion for producing the $H_2$ and CO reformate from bio-methane, the reaction temperature must be controlled below 1200° C. Since biogas contains a large amount of $CO_2$, and the $CO_2$ has a high heat capacity, it can be used to replace portion of the feed water. Therefore, for the ATR reformer of this biogas CHP generator, the $O_2/CH_4$ ratio of the inlet fuel mixture is controlled at a value between 0.05 to 0.80, and the $(CO_2+H_2O)/CH_4$ ratio between 0.05 to 10.0.

U.S. Pat. Nos. 4,522,894, 9,440,851 and also the paper by Giroux et. al. (Applied Catalysis B. vol. 55, 185-200 (2005), herein incorporated by references, have demonstrated that the monolithic Pt metal group catalysts can effectively convert the hydrocarbons or bio-fuels into $H_2$ and CO combustible gas by catalytic partial oxidation reactions, or by autothermal reactions. Therefore, this biogas CHP generator will continue to use the same monolithic Pt group metal catalysts prepared, described and used by U.S. Pat. Nos. 4,522,894 and 9,440,851 patents.

After the reformer, the dry reformate produced by either the ATR or the CPO reformer can be cooled, compressed and stored in high pressure vessels between 1 to 100 atmospheres. The stored reformate can then be used as fuel for the downstream IC engine/gas turbine to drive a generator, and to produce electricity for the system's control computer and instruments. Simultaneously, the electricity produced by wind turbine, solar panel and/or the electricity from battery can also be used to operate the controllers, and the excess electricity can be utilized to do electrolysis of DI water to produce $H_2$ and $O_2$. Under the normal operating conditions, the $H_2$ so produced can be used as portion of the lean fuel mixture for an IC engine/gas turbine to increase its combustion efficiency; The $O_2$ so produced can be used to replace air as reformer's reactant to perform autothermal reactions and to produce the $H_2$ from the biogas. Furthermore, the produced $H_2$ can be compressed to a high pressure tank and, thus, the excess electricity can be stored as $H_2$. When necessary, the stored $H_2$ can later be used by fuel cell devices and/or IC engines to produce electricity.

Based on thermodynamic equilibrium calculations, if pure $O_2$ and pure $CH_4$ are used in the inlet fuel mixture without the N2 dilution from air, the % $(H_2+CO)$ concentration in the reformed gas generated by the CPO reformer can be increased from about 40% to about 60%. However, using the identical inlet fuel mixture, the % $(H_2+CO)$ concentration generated by an ATR reformer can be increased from about 51% to about 72%. Therefore, using pure $O_2$ to replace air as ATR/CPO reformer's reactant can improve the % $(H_2+CO)$ in the reformate to the concentration close to that produced by the steam reforming reactions. In this case, the ATR reformer, which can produce higher % $(H_2+CO)$ reformate from the same fuel mixture, will have the same SR reformer's advantage over the CPO reformer.

To reduce the sulfur content of the purified biogas below 10 ppbv for the fuel cell devices, a polishing desulfurizer bed, which comprises both the regenerable Pt group metal catalysts and the oxide sulfur adsorbents, is controlled at a temperature between −25° to 600° C. This polishing desulfurizer bed can be installed between the high temperature regenerable adsorbent bed and the subsequent ATR/CPO reformers as shown in FIG. 1.

Finally, the hot reformate from the reformers and the hot exhaust gas from the IC engine/gas turbine can passed through heat exchangers to provide hot water and/or hot air for the local residents.

DETAILED DESCRIPTION OF THE INVENTION

Description of the Preferred Embodiments

Figure 1:
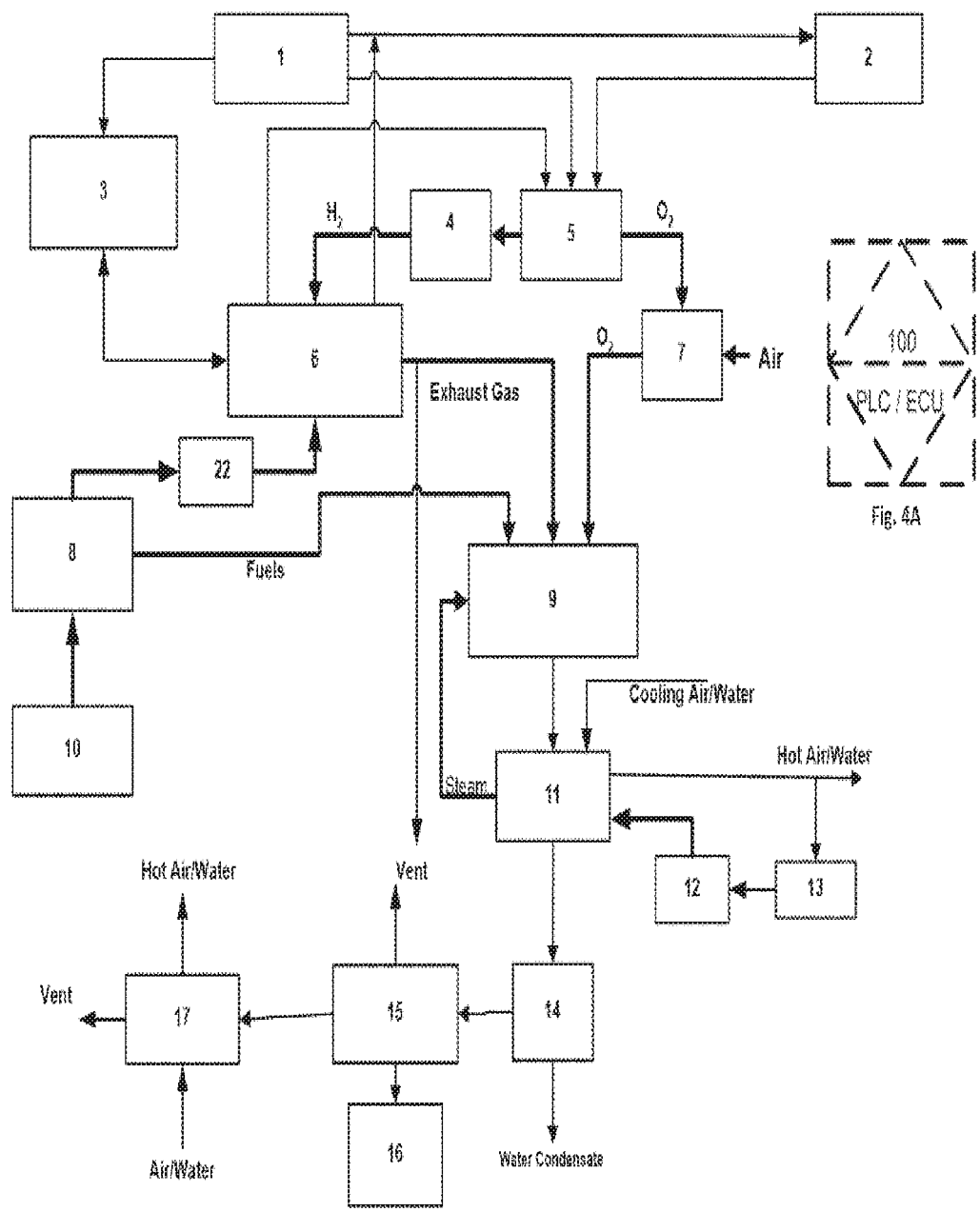
FIG. 1: Flow Chart for a Catalytic Biogas Combined Heat and Power Generator.

Because of the global warming and the abnormal worldwide weather pattern in recent years, it is wise to combine the renewable energy resources such as biogas, solar, wind and geothermal energies to cut down the carbon emission and to provide heat and electricity from biogas for daily living.

For this invention, a Catalytic Biogas Combined Heat and Power (CHP) Generator and method of operating this CHP generator comprises:

(1). one biogas storage tank at 1 to 100 atmospheres;

(2). one regenerable desulfurization system comprising:

a) one CPO sulfur converter for converting all sulfur compounds in the biogas over the supported Pt group metal catalyst into $H_2S$ at a temperature between 200° to 800° C., wherein the $O_2/C$ ratio of the inlet fuel mixture is between 0.05 to 0.25, and the % ($H_2$+Steam) in the gas mixture is between 0% to 20%, and b) one high temperature regenerable adsorbent bed at a temperature between 300° to 900° C., wherein the supported Pt group metal catalyst containing one or more oxides selected from the group of Ni, Cu, Fe, Co, Mo, Zn, Cu/Zn, Ce, Ce/Zr, Al, Mn and the mixture thereof are used to react/adsorb the $H_2S$ on the catalyst, c) one engine exhaust gas with <2% excess $O_2$ or a hot gas containing <5% $O_2$ and <2% $CH_4$ for catalyst regeneration, wherein the reacted/adsorbed sulfur on said supported Pt metal group catalyst is converted into odorless $SO_2$ at a temperature between 300° to 900° C.;

(3). one or more catalytic biogas reformers for producing various type of reformate gas over the Pt group metal catalysts by controlling the $O_2/CH_4$ ratio of the reformer's inlet fuel mixture selected from:

a) one flex-fuel catalytic ATR reformer to produce $H_2$ reformate as a fuel for the IC engine/gas turbine, fuel cell electric generator or $H_2$ storage, wherein the reformer's inlet fuel mixture contains $O_2/CH_4$<0.80 and ($H_2O$+$CO_2$)/$CH_4$<10.0;

b) one steam generating reformer to produce high pressure steam for a steam turbine/steam engine, wherein the inlet fuel mixture of the generator is operated at $O_2/CH_4$ ratio>1.0, $H_2O/CH_4$ ratio>3.0 and at a temperature below 1000° C. and a pressure between 5 to 50 atmospheres, and c) one CPO reformer to adjust the reformate's $H_2/CH_4$ ratio as a fuel for the reformate engine/gas turbine, wherein the $O_2/C$ ratio of the biogas inlet fuel mixture is <0.80, and the ($CO_2$+$H_2O$)/$CH_4$ is <5.0, (4). one or more power devices selected from the group of reformate engine, gas/steam turbine, steam engine, IC engine and fuel cell device for utilizing the proper reformate produced from the reformers described in (3) to produce power, wherein they are used to drive one or more electric generators to generate electricity;

(5). several heat exchangers for recovering heat from the reformate and/or from the engine/gas turbine's exhaust gas, wherein the produced hot air and/or hot water from the heat exchangers are available for local residents and/or for general applications;

(6). one electrolyzer for dissociating DI water to produce $H_2$ and $O_2$, wherein the generator's self-generated electricity, and/or the electricity generated from a solar panel, a wind turbine, or an electric grid are used for the electrolysis of water;

(7). several storage tanks for storing the reformate, $H_2$ and $O_2$ gases at 1 to 100 atmospheres, wherein each stored gas is used for general application; and (8). an automatic control system consisting of a control computer/micro processor, valves, flow controllers, thermocouples, sensors, pumps and control software, wherein the controlling system is used to deliver the specific inlet fuel mixture to each reformers at the specific $O_2/CH_4$, $H_2O/CH_4$, ($H_2O$+$CO_2$)/$CH_4$ ratios, and also to control the reactions at the specific temperature and pressure.

Producing Hydrogen from Hydrocarbons and Bio-Fuels:

In the 1980s, U.S. Pat. No. 4,522,894 first introduced the monolithic $Pt/Pd/Al_2O_3$ catalyst to produce $H_2$ and CO by the catalytic partial oxidation reactions of the sulfur containing commercial diesel fuel, and also to provide heat for the following $Ni/Al_2O_3$ or $Pt/Rh/Al_2O_3$ pellet catalyst to produce more $H_2$ and CO by catalytic steam reforming (SR) reactions. Because of its extremely rapid reaction rate and an excellent selectivity, the $O_2$ in the reformer's inlet fuel mixture can be converted completely in less than 36 milliseconds (space velocity>100,000/hr@STP), and it is also found that the reacted diesel oil was mostly converted selectively into the main $H_2$ and CO products, but not the unwanted full combustion products of $H_2O$ and $CO_2$. Therefore, it was concluded that the monolithic $Pt/Pd/Al_2O_3$ catalyst is an excellent partial oxidation catalyst. Later, in the 2000s, further additional developments worldwide had found that the unsupported or the supported monolithic or pellet Pt group metal catalysts were all excellent partial oxidation catalysts for producing $H_2$ and CO from fuels such as natural gas, LPG, vaporized hydrocarbons and bio-fuels.

According to U.S. Pat. Nos. 4,522,894 and 9,440,851, the Pt group metal catalysts could be prepared by impregnating one or more of Pt group metal solutions at a given concentration into an $Al_2O_3$ power, and obtain a catalyzed washcoat powder at 0.01 to 10.0% metal content. The $Al_2O_3$ power has surface area between 50 to 600 m2/g, and also contains high temperature oxide stabilizer such as one or more oxides selected from the group of lanthanum, cerium, praseodymium, rhenium, zinc, tin, calcium, potassium, zirconium, yttrium, barium, strontium, neodymium, magnesium and the mixture thereof. Furthermore, one or more oxide powders, which are selected from the group of Ni, Cu, Fe, Co, Mo, Zn, Cu/Zn, Ce, Ce/Zr, Al, Mn and the mixture thereof, can be added and mixed with the above catalyzed Pt group washcoat powder as the $H_2S$ adsorbents, and these $H_2S$ adsorbents are either unsupported oxides or oxides supported on the above stabilized $Al_2O_3$. Then, the combined washcoat powders are coated on the surface of an high temperature inert carrier such as the ceramic monolithic support to obtain the total Pt group metal loading between 0.1 to 2500 g/ft3.

The inert monolith support was a ceramic carrier which contains 10 to 1200 CPI. The other suitable inert catalyst support can be a ceramic monolith, metallic monolith, pellet, wire mesh, screen, foam, plate, silicon carbide, static mixer etc. For the mobile devices/equipments, monolithic catalyst supports are preferred. But the monolith, pellet, gauze, wire mesh, screen, foam, plate, static mixer, heat exchanger or other shapes of catalyst's supports can satisfactory be used for stationary devices/equipments.

To be used as the catalyzed washcoat support, the inert materials must be capable of sustaining a temperature between 500° C. to 1200° C. in a rich or lean atmosphere without losing its surface area, strength and shape. For example, the inert ceramic substrate can be made of alumina, alumina-silica, alumina-silica-titania, mullite, cordierite, zirconia, zirconia-ceria, zirconia spinel, zirconia-mullite or silicon carbide, and the metallic substrate can be made of Fecralloy, Kanthal, stainless steel and other high temperature alloys.

Biogas ATR Reformer:

Due to the fact that the biogas contains large amount of $CO_2$, and $CO_2$ has high heat capacity, $CO_2$ can be used to replace water in the inlet fuel mixture for controlling the reformer's temperature below 1200° C. In other words, the composition of the inlet reformer's biogas fuel mixture should be modified, and the $H_2O/CH_4$ ratio in the inlet fuel mixture can be decreased, and the CO $O_2/CH_4$ ratio can be increased from those described in U.S. Pat. No. 9,440,851. For this Biogas CHP Generator, the $O_2/CH_4$ of the inlet reformer fuel mixture should be maintained <0.80, and the $(H_2O+CO_2)/CH_4$ ratio between <10.0. In general, the reformer's temperature should be controlled below 1200° C. to maintain high methane conversion activity, and also to extend catalysts' service life without thermal deactivation and coke formation.

Additionally, the preferred operating condition without coke formation for this biogas CHP generator is to perform the reforming reactions, and to generate electricity under a steady (stationary) condition. Therefore, the reactants' flow rates, the inlet $O_2/CH_4$ ratio, the inlet $(CO_2+H_2O)/CH_4$ ratio and the reactor temperature are mostly controlled under a given steady state operating condition, and avoid any sudden abrupt change of each reactant's flow rate.

According to U.S. Pat. No. 9,440,851, all hydrocarbons which can be vaporized such as natural gas, LPG, CNG, biogas, bio-ethanol, methanol, gasoline, diesel, bio-diesel and other hydrocarbons, can be converted in this reformer to produce $H_2$ and CO reformate by the Pt group metal catalysts under a given temperature and pressure. Therefore, in emergency or any special occasions, any one of the above fuels and/or their fuel mixture can be used as fuel for this apparatus. In other words, in addition to biogas, this Biogas CHP Generator is a multiple fuel CHP generator.

Reformate IC Engine/Gas Turbine:

According to U.S. Pat. Nos. 4,522,894 and 9,440,851, if the $O_2/C$ ratio of the inlet reformer's fuel mixture is below 0.50 at a space velocity>100,000/hr (@STP), all $O_2$ in the mixture will completely be converted by the Pt group metal catalysts to become part of the reformed gas, while the conversion of the hydrocarbon fuel will be less than 100%. Therefore, the % biogas conversion can be controlled by adjusting the $O_2/CH_4$ ratio of the inlet fuel mixture between 0.05 to 0.50. In other words, the % methane remaining in the reformed gas can be controlled by adjusting the $O_2/CH_4$ ratio and, thus, can produce various $H_2/CH_4$ ratios of the Hythane gas (i.e. methane and $H_2$ mixture) for the downstream IC engine/gas turbine. As mentioned previously in U.S. Pat. No. 7,721,682, herein incorporated by reference, the Hythane gas mixture can improve the engine's thermal efficiency and can reduce the NOx pollution.

Catalytic High Pressure Steam Generating Reformer:

According to reaction (4), bio-methane can be combusted completely into $CO_2$ and $H_2O$, and the total reaction heat produced by the reaction can then be used completely to vaporize water and to generate high pressure reformate containing high % steam. This reformate stream is then used via pressure difference to drive a steam turbine, a turbocharger or a steam engine, which in turn will drive an electric generator to generate electricity (U.S. Pat. No. 8,397,509). Therefore, this catalytic reformer can be used to replace a traditional power plant's shell and tube boiler for high pressure steam generation. In addition, complete catalytic combustion of bio-methane with excess oxygen at a temperature below 1000° C. will not produce $CH_4$ and NOx pollutants, and the total reaction heat is used completely for steam generation. In other words, there are no waste heat loss through the flue gas, and the system's thermal efficiency is improved.

Flow Control Curves:

One or more flow control curves can be used to define each reformer's reactant flow rate and the total reformer's output flow capacity as a function of pressure in the reformate's storage vessels. In other words, a given flow control curve is used to regulate each reactant's flow rate, to define the $O_2/CH_4$ and $(CO_2+H_2O)/CH_4$ ratios of the inlet fuel mixture, to define the dry reformate composition, to decide the reformer's start-up and shutdown, to regulate the reformer's operating temperature and pressure, and to determine the total reformer's reformate flow output. Briefly, according to the location on a given control curve, every single point on a given control curve can supply a group of pre-calibrated set points for all flow meters/controllers, the operating temperature and pressure, and these set points are down loaded from the control computer and/or the microprocessors to the programmable Logic Controller (PLC) for the purpose of controlling each reactant's flow rate, and the reformer's temperature and pressure; Once each reactant's flow rate is fixed according to the pre-calibrated set point, the $O_2/CH_4$ and the $(H_2O+CO_2)/CH_4$ ratios of the inlet fuel mixture are fixed, and the total flow rate of the inlet fuel mixture is fixed. Subsequently, after complete conversion of the inlet $CH_4$ and $O_2$ by the Pt group metal catalysts in the biogas reformer at a given reaction temperature and pressure, the total reformate flow output produced and the dry gas composition are determined.

In addition, if several multiple points on the same control curve are pre-calibrated at the same the $O_2/CH_4$ and the $(H_2O+CO_2)/CH_4$ ratios, but at different flow rates, these points are capable of producing a series of different reformate flow outputs with the same dry gas composition. Furthermore, multiple pre-calibrated control curves for other fuels are used to provide different reformer's inlet fuel mixtures and, thus, would produce by the same reformer the dry reformate from various hydrocarbon fuels and/or bio-fuels with different gas composition. In other words, by selecting the proper control curve, this reformer can operate effectively and efficiently with all potential fuels, and the biogas CHP generator can be a multiple fuel CHP generator. Therefore, it can be very useful in an emergency situation when biogas is not available or in short supply.

Catalytic De-Sulfurization Process:

If the biogas contains high % sulfur compounds and/or other various containments, one low temperature pre-desulfurizer at a temperature between −25° to 50° C. can be installed between the biogas storage tank and the CPO sulfur converter. The regenerable supported Pt group metal catalysts is preferred to be used in this pre-desulfurizer, and it comprises: (1). one or more regenerable Pt group metal catalysts, which comprise one or more metals of Pt, Pd, Rh, Ir, Ru, Os and mixture thereof, are supported on the stabilized $Al_2O_3$, and (2). one or more oxides selected from the group consisting of Zn, Ni, Ce, Ce/Zr, Fe, Co, Mo, Cu, Cu/Zn, zeolite, Mn, La, Ba, Sr, Al, Si and mixture thereof, wherein these oxides can be unsupported or supported on the stabilized $Al_2O_3$.

As described previously in U.S. Pat. No. 4,522,894, all organic sulfur compounds can be converted into $H_2S$ by the hydrogen produced inside the ATR reformer, and the produced $H_2S$ can be adsorbed and removed from the reformate by the downstream ZnO bed at a temperature between 300° to 400° C. However, under the influence of high % water/steam, the capacity of adsorbing $H_2S$ by ZnO will be decreased rapidly from 10-20 gS/100 g to 0.1 gS/100 g, and lost its efficiency to remove $H_2S$ from the stream (Farrauto, R. et al., Annu. Rev. Mater. Res. 2003, Vol. 33, Page 1-27). Therefore, in order to improve the $H_2S$ adsorption capacity, the $O_2/CH_4$ ratio of the inlet fuel mixture to the CPO sulfur converter in this regenerable desulfurization system is controlled at a value between 0.05 to 0.25, and the % ($H_2$+Steam) between 0 to 20%.

At a value of the $O_2/CH_4$ ratio between 0.05 and 0.25, enough amount of $O_2$ is provided to convert all the sulfur compounds in the inlet fuel mixture into $H_2S$ by the hydrogen produced from the CPO reactions of biogas. Then, the produced $H_2S$ is removed effectively in the following adsorption bed at a temperature between 200° to 800° C. It is known that sulfur compounds can be adsorbed strongly on the oxide surface of Ni, Cu, Fe, Co, Mo, Zn, Cu/Zn, Ce, Ce/Zr, Al, Mn and the mixture thereof, and that the Pt group metal catalyst can convert the adsorbed/reacted sulfur into $SO_2$. Therefore, as discussed previously, this high temperature regenerable adsorbent bed comprises one or more regenerable supported Pt group metal catalysts, which also contains one or more oxides as $H_2S$ adsorbents. However, the catalyst must be kept below 900° C. to avoid thermal deactivation of the Pt group catalyst and the $H_2S$ adsorbents.

Subsequently, the de-sulfurized biogas is then used by one or more CPO, ATR and steam generating reformers to produce various reformate composition according to the demand of the desired applications, as shown in FIG. 1.

The adsorbed/reacted sulfur on the catalyst's washcoat (i.e. oxide) can be regenerated by passing either an exhaust gas with <2% excess $O_2$, or a hot gas containing <5% $O_2$ and <2% $CH_4$ over the Pt group metal catalysts, and can be released as $SO_2$ at a temperature between 300° to 900° C. If the engine's exhaust gas is below 300° C., it is necessary to inject both air/$O_2$ and $CH_4$ simultaneously, and uses the CPO reaction heat to maintain the temperature during the regeneration. However, most of the time, the engine's exhaust gas temperature is high enough to do the regeneration and, in this case, only $O_2$/air is required to be injected into the exhaust gas.

During regeneration, the adsorbed/reacted sulfur will be converted into $SO_2$, which can either be vented into atmosphere, or be removed/absorbed by the traditional lime/limestone, water, or caustic soda wash techniques.

Due to the fact that every adsorbent has its own unique adsorbing capacity (i.e. limitation) for removing a specific contaminant compound, a combination of several different adsorbents operated at different temperatures is frequently required to remove completely the contaminants from a given fuel mixture, and the adsorbents are most likely required to be changed when a new fuel with different sulfur compounds is admitted into the inlet fuel mixture. However, if all organic sulfur compounds in the inlet fuel mixture are converted catalytically into $H_2S$, the removal of all sulfur compounds becomes a simpler task of removing $H_2S$ from the reformate stream. Furthermore, since the supported Pt group catalysts used here can be regenerated for continuous application, this new sulfur removal technology becomes very convenient, and the catalyst/adsorbent can have a longer service life without being replaced and/or being land filled. Therefore, it has advantages over the current biogas non-regenerable $H_2S$ removal techniques described previously.

To avoid deactivation of the electrodes for the fuel cell electric generators, such as PEMFC and SOFC, the sulfur level of the purified biogas must be maintained below 10 ppbv, while it is satisfactory to maintain below 25 ppmv for an IC engine/gas turbines. In other words, the degree of desulfurization of the biogas will depend on the intended application.

To insure the sulfur content of the purified biogas is constantly maintained below 10 ppbv, a polishing desulfurizer bed, which is controlled at a temperature between −25° to 600° C., can be installed between the high temperature regenerable adsorbent bed and the ATR/CPO reformer. This polishing desulfurizer bed comprises: (1). one or more regenerable Pt group metal catalysts supported on the stabilized $Al_2O_3$, and (2). one or more oxides selected from the group consisting of Zn, Ni, Ce, Ce/Zr, Fe, Co, Mo, Cu, Cu/Zn, zeolite, Mn, La, Ba, Sr, Al, Si and mixture thereof. The main purpose of this polishing desulfurizer is to clean up the residual sulfur compounds before the reformers with oxide adsorbents at a lower space velocity (i.e. larger adsorbent reactor volume).

Other fuels, such as natural gas, LPG, bio-ethanol, methanol, gasoline, diesel, bio-diesel, and other vaporized organic compounds, can utilize this sulfur removal methods and this Catalytic Biogas CHP Generator to remove all sulfur compounds from the fuel mixture. In other words, if the $O_2$/C ratio in the inlet fuel mixture of this CPO reformer is controlled at a value between 0.05 to 0.25 (i.e. C is the fuel carbon, does not include C in $CO_2$), and the % ($H_2$+$H_2O$) is between 0% to 20%, all organic sulfur compounds in any fuels mentioned previously will be converted into $H_2S$ by the $H_2$ produced by the CPO reaction, and the $H_2S$ can be removed by the subsequent high temperature regenerable adsorbent bed and, if necessary, by the additional polishing desulfurizer bed.

Exemplary Embodiments Described

Figure 2:
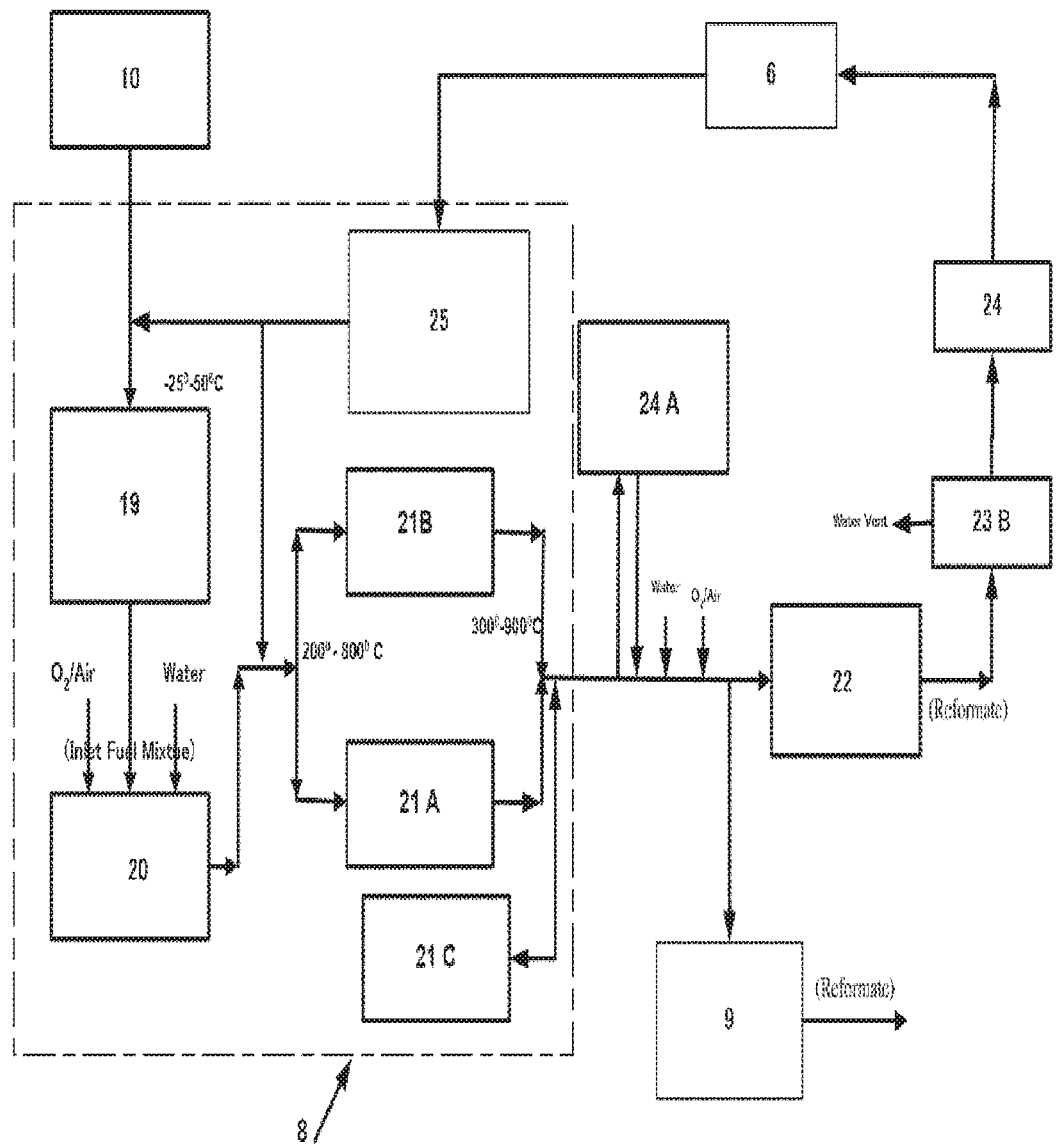
FIG. 2: Flow Chart for a Regenerable Desulfurization System (identified by #8).

FIG. 1 is the flow chart for the Catalytic Biogas CHP Generator of this invention. As shown in FIG. 1. the biogas which is generated by an anaerobic digester can be stored in tank #10, and the excess water, $H_2S$ and other contaminants in the biogas will first be treated in the desulfurization system #8. As shown in FIG. 2, the desulfurization system #8 comprises: (a). one low temperature pre-desulurizer (#19); (b). one CPO sulfur converter (#20); (c). two parallel high temperature $H_2S$ adsorbent beds (#21A & 21B); (d). one polishing desulfurizer (#21C). Here, the low temperature pre-sulfurizer (#19) is used to partially remove the $H_2S$, moisture and other contaminants from the biogas; CPO converter #20 is used to convert all remaining sulfur compounds into $H_2S$; the two parallel high temperature adsorbent bed #21A/21B are used to remove the $H_2S$ from the biogas down to about 25 ppm level for the IC reformate engines, and the polishing desulfurizer (#21C) is used to remove the $H_2S$ in the reformate from about 25 ppm down to 10 ppbv level for the fuel cell devices. Briefly, the CPO sulfur converter #20 and the adsorbent bed #21A and #21B are the main units for removing the sulfur compounds from the biogas in this desulfurization system #8. But the pre-desulfurizer #19 and the polishing desulfurier #21C are optional units, which are used only when the system requires additional treatments to either remove extra containments from the biogas, or to meet the more demanding sulfur requirement of the downstream fuel cell devices.

As shown in FIG. 2, the dry desulfurized biogas from the desulfurization system #8 is compressed and is stored in tank #24A at a pressure between 1 to 100 atmospheres. It can then be injected directly with additional amount of water and air/$O_2$ into the following CPO reformer (#22) to provide a fuel mixture at a given $O_2/CH_4$ and $H_2O/CH_4$ ratio. This CPO reformer #22 in the system can adjust the $H_2/CH_4$ ratio to provide a given Hythane gas for the downstream reformate engine #6. In addition, the desulfurized biogas can be injected with additional amount of air/$O_2$ and water at a specified $O_2/CH_4$ and $H_2O/CH_4$ ratio to the following ATR or steam generating reformer (#9), and the reformers will produce the reformate according the fuel mixture's $O_2/CH_4$ ratio for the downstream power generating devices, such as IC engine, gas turbine, steam turbine/engine, fuel cell electric generators et. al.

Also, shown in FIG. 2, the exhaust gas from the reformate engine #6 can be used to the regenerate the Pt group metal catalysts which are used in the pre-desulfurizer #19, the high temperature $H_2S$ adsorbent bed #21A and #21B, and the polishing desulfurizer #21C at a temperature between 300° and 900° C. In this case, the exhaust gas with air injection to <2% $O_2$ is required to convert the adsorbed/reacted sulfur on the catalyst adsorbents into $SO_2$. However, if the temperature of the exhaust gas is not high enough, it is necessary to inject both biogas and air to obtain <5% $CH_4$ and <2% $O_2$ concentration, and to produce reaction heats over the Pt group metal catalyst for maintaining the regeneration temperature. Furthermore, any hot gas containing <5% $CH_4$ and <2% $O_2$ can also be used to replace the exhaust gas for the catalyst regeneration.

As shown in FIG. 1, in addition to provide electricity to the CHP generator's PLC controller unit #3, the excess electricity from reformate engine and electric generator #6 can be combined with wind power/solar power #1, and/or the electricity from the general distribution grid #2 to perform electrolysis of DI water in vessel #5. The $H_2$ and $O_2$ so produced can be stored separately in tanks #4 and #7 respectively. The $H_2$ in tank #4 can be used to assist the lean fuel combustion at high compression ratio inside the reformate engine's cylinder, which can improve its thermal efficiency; The $O_2$ in tank #7 can be used to replace air as the reformer's oxidant in the ATR reformer's inlet fuel mixture, which can improve the % ($H_2$+CO) concentration in the reformate to be close to that produced by a steam reformer, and can make the separation of $H_2$ from other gases easier.

When the reformer is first started, the biogas and the $O_h$ fuel mixture must reach a minimum temperature (i.e. light-off temperature) between 200 to 350° C. to initiate and to accelerate the catalytic partial oxidation reactions of bio-methane. Therefore, the biogas fuel mixture must be preheated by one of the following three methods: (1). utilize the exhaust gas from engine #6; (2). utilize the $H_2$ and $O_2$ gases in tanks #4 and #7 to generate the oxidation reaction heat by passing them through the Pt group catalyst bed, and (3). utilize an igniter to ignite the biogas and air/$O_2$ flame. Because $H_2$ and $O_2$ can react with each other to produce the reaction heat over the Pt group metal catalyst at the room temperature, using the produced reformate or the engine's exhaust gas is an excellent method to preheat the reformer. After the CPO reaction is initialized, the CPO reaction of bio-methane can generate enough reaction heat to keep the catalyst itself above its minimum reaction temperature (i.e. light-off temperature), and the reactions can be performed in an adiabatic condition.

After the ATR and water gas shift reformer #9, the reformate can pass through heat exchanger #11, and the cooled dry gas is stored in tank #14. The IC engine/gas turbine #15 can then use the stored reformate to drive an electric generator #16 to generate electricity. Finally, the exhaust gas from #15 can passed through #17 heat exchanger to generate hot water or hot air to provide heat for local residents. However, if a steam generating reformer is used to replace the ATR reformer in #9, the high pressure reformate containing high % steam can be used to drive a steam turbine/engine, and an electric generator to generate electricity. After the heat exchanger #11, the condensed water can be recycle back to #9 for reuse according to U.S. Pat. No. 8,397,509, and hot water and hot air are also generated from heat exchanger #11.

Figures 3, 4A:
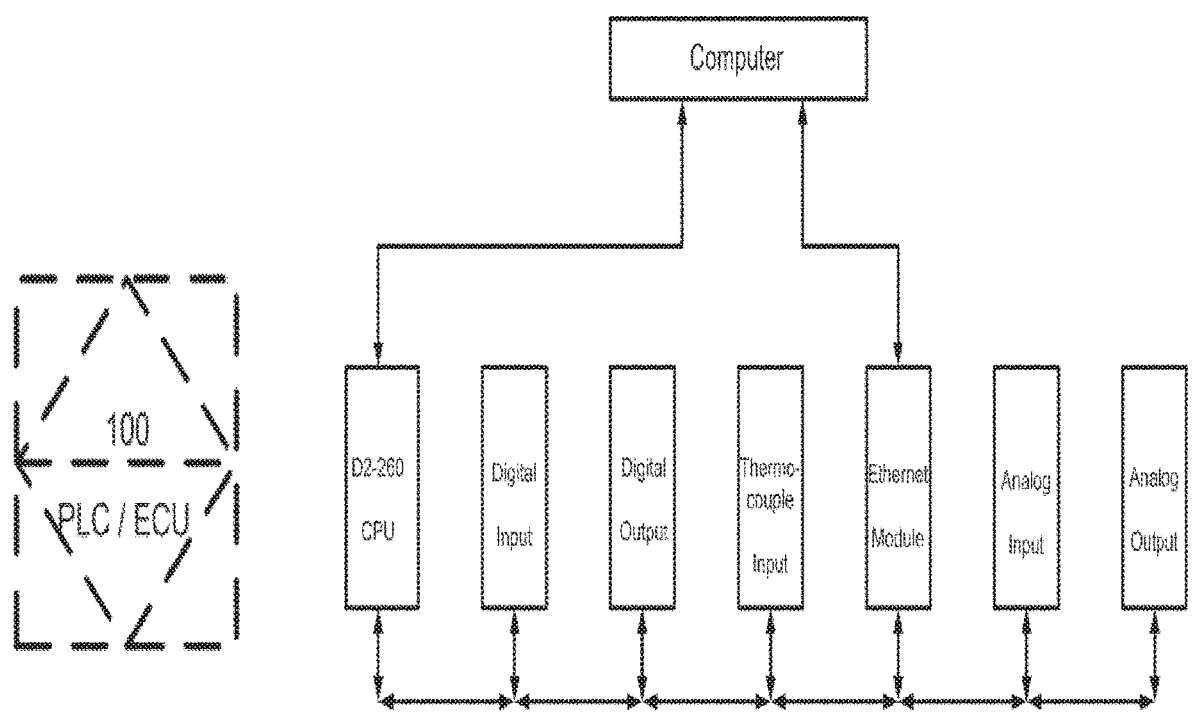
FIG. 3: Automatic Control Hardware Devices Consisting of One computer, One Programmable Logic Controller (PLC) and Several Input/output Interface Modules.

FIG. 3 is the brain of the control system, and it is shown as FIG. 3A in FIG. 1. Here, a programmable logic controller (PLC) can communicate with a PC laptop computer via a RS-232 or an Ethernet cable, and the PLC can communicate with the input/output modules which connect directly to the automatic controlled devices. A control software is stored in the PC. As a group of the pre-calibrated set points is down loaded from the PC to the CPU inside the PLC, the CPU will then transmit the control signals to the respective control channels of the output module and, then, to the flow controllers to perform the actual flow rate and/or temperature control. In other words, when a given output module receives the set points, it will give the set point signals to each controlling device such as flow controllers, solenoid valves, oxygen sensor/regulator, temperature PID loops, and other instrument and devices, and the controlling devices would control flow rate and temperature according to the set points received. Similarly, each device can transmits its current status and any update information from the input modules to the PC computer via the reverse signal transmission loops.

Figure 4:
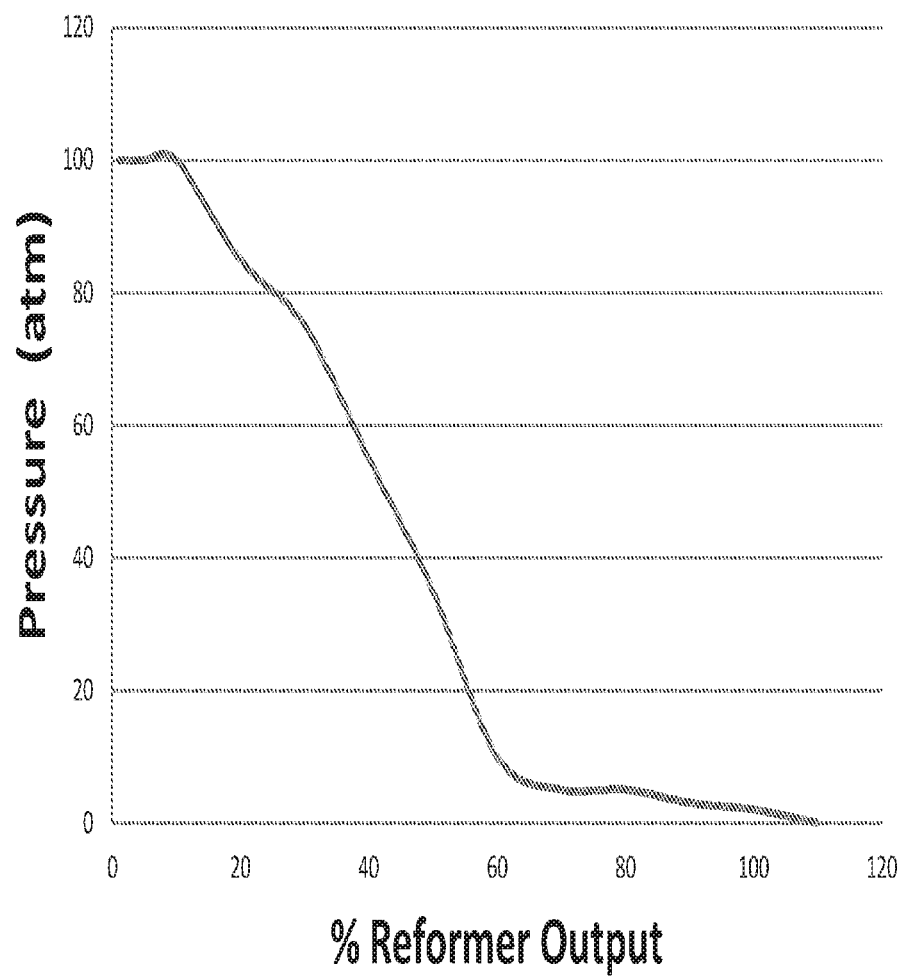
FIG. 4: A Control Curve for Reactants' Flow Rates as a Function of Reformate Pressure in the Storage Vessels.

FIG. 4 is an actual control curve, which indicates the % reformate flow output as a function of the pressure in the storage vessel. Briefly, every point on a given control curve includes a group of pre-calibrated set points for each flow controller and for the operating temperature and pressure. Therefore, each point will provide the fuel mixture with a given pre-calibrated $O_2/CH_4$ and $(H_2O+CO_2)/CH_4$ ratios, the pre-calibrated reactants' flow rate and the total reformate flow output flow. In other words, a given group of set points will be down loaded from the control PC to the PLC, these pre-calibrated flow set points will be transmitted individually to each flow controller and the flow controller in the system will adjust each reactant's flow rate. By combining and mixing each reactant's flow rate together at the reformer's inlet, a fuel mixture with the specified pre-calibrated $O_2/CH_4$ and $(H_2O+CO_2)/CH_4$ ratios can be obtained. If every point in the same control curve is pre-calibrated to give the fuel mixture with the same $O_2/CH_4$ and $(H_2O+CO_2)/CH_4$ ratios, but with different flow rates, every point on the same control curve will provide the same reformate composition but with different flow output. Similarly, different pre-calibrated control curve can provide a biogas fuel mixture with different $O_2/CH_4$ and $(H_2O+CO_2)/CH_4$ ratios and, thus, different reformate composition and flow output.

For other hydrocarbons and bio-fuels, similar pre-calibrated control curve can provide a fuel mixture with a given $O_2/CH_4$ and $(H_2O+CO_2)/CH_4$ ratio and, thus, a given reformate composition and flow output can be obtained.

For a small system, the combination of a PC and a PLC can be replaced with a powerful microprocessor, or by a PC which is equipped with the necessary input/output modules to accomplish the same control strategy.

What is claimed is:

1. A method to desulfurize a biogas, comprising:
storing the biogas in a biogas storage tank;
maintaining an atmosphere of said biogas in said biogas storage tank between 1 atmosphere to 100 atmospheres;
converting said biogas by:
   providing an inlet fuel mixture comprising the biogas and $O_2$ or air and optionally steam into a CPO sulfur converter;
   reacting a sulfur compound present in the biogas over a first supported Pt group metal catalyst disposed in the CPO sulfur converter at a temperature between 200° C. to 800° C. to produce $H_2S$;
   maintaining an $O_2$/C ratio of the inlet fuel mixture between 0.05 to 0.25 in said CPO sulfur converter; and
   holding a percentage of product $H_2$ and input steam between 0% to 20% in said CPO sulfur converter;
adsorbing the $H_2S$ in a high temperature adsorbent bed at a temperature between 300° C. to 900° C. with a second supported Pt group metal catalyst disposed therein, wherein the second supported Pt group metal catalyst contains at least one of an oxide selected from at least one of a Nickel, a Copper, an Iron, a Cobalt, a Molybdenum, a Zinc, a Copper/Zinc alloy, a Cerium, a Cerium/Zirconium alloy, an Aluminum, and a Manganese; and
regenerating the first and/or second supported Pt group metal catalyst with at least one of 1) engine exhaust and 2) a hot gas containing less than 5% $O_2$ and less than 2% $CH_4$, thereby converting the absorbed sulfur and/or adsorbed sulfur on said second supported Pt metal group catalyst into an odorless $SO_2$.

2. The method of claim 1, further comprising controlling an $O_2$/$CH_4$ ratio of a reformer inlet fuel mixture.

3. The method of claim 1, wherein the CPO sulfur converter is at least one of a flex-fuel catalytic ATR, a steam generating reformer and a CPO reformer.

4. The method of claim 1, further comprising storing at least one of a reformate and a $H_2$ gas and an $O_2$ gas between 1 to 100 atmospheres in a reformate storage tank.

5. The method of claim 1 further comprising using an automatic control system, said automatic control system programmed to:
control a valve;
operate a flow controller;
read a signal from a thermocouple;
read a signal from a sensor;
operate a pump, thereby controlling at least one of 1) an inlet fuel mixture to a reformer at an $O_2$/$CH_4$ ratio, 2) a $H_2O$/$CH_4$ ratio, 3) a ($H_2O+CO_2$)/$CH_4$ ratio, 4) a temperature of a chemical reaction of the reformer, and 5) a pressure of the chemical reaction of the reformer.

6. The method of claim 1, further comprising using a bio-fuel, a natural gas, a LPG, a CNG, a biogas, a bio-ethanol, a methanol, a gasoline, a diesel, and a bio-diesel as the biogas.

7. The method of claim 1, further comprising controlling a low temperature pre-desulfurizer bed to operate at a temperature between −25° to 50° C. which is installed between a biogas storage tank and a desulfurizer.

8. The method of claim 1, further comprising combining a stabilized $Al_2O_3$ powder with at 0.01% to 10.0% metal content with the first and/or second Pt group metal catalyst, said first and/or second Pt group metal catalyst including at least one of a Platinum, a Palladium, a Rhodium, an Iridium, a Ruthenium and an Osmium.

9. The method of claim 8, further comprising combining the stabilized $Al_2O_3$ with a high temperature oxide stabilizer, wherein the high temperature oxide stabilizer is at least one of a lanthanum, a cerium, a praseodymium, a rhenium, a zinc, a tin, a calcium, a potassium, a zirconium, an yttrium, a barium, a strontium, a neodymium and a magnesium.

10. The method of claim 1 further comprising coating a surface of the first and/or second Pt group metal catalyst with a high temperature inert carrier at 0.1 to 2500 g/ft³, wherein said carrier is at least one of a ceramic monolith, a metallic monolith, a pellet, a wire mesh, a screen, a foam, a plate, a gauze, a silicon carbide, a static mixer and a heat exchanger.

* * * * *